United States Patent [19]

Pampouchidis et al.

[11] 4,403,050
[45] Sep. 6, 1983

[54] CATHODICALLY DEPOSITABLE ESTER-CONTAINING COATING COMPOSITIONS

[75] Inventors: Georgios Pampouchidis; Wolfgang Daimer; Heiner Verdino, all of Graz, Austria

[73] Assignee: Vianova Kunstharz, A. G., Vienna, Austria

[21] Appl. No.: 860,131

[22] Filed: Dec. 19, 1977

[51] Int. Cl.$^3$ .................................................. C08L 67/08
[52] U.S. Cl. ................................... 523/501; 204/181 C; 524/539; 524/901; 525/440; 525/442; 525/443; 528/71; 528/75
[58] Field of Search .................. 260/29.2 E, 29.2 TN, 260/22 CB, 22 TN; 523/501; 524/591, 901, 539; 204/181 C; 525/440, 442, 443; 528/71, 75

[56] References Cited

U.S. PATENT DOCUMENTS 4,237,038 12/1980 Pampouchidis et al. ... 260/92.2 TN
4,238,594 7/1980 Pampouchidis ................... 528/69

Primary Examiner—Theodore E. Pertilla
Attorney, Agent, or Firm—A. W. Breiner

[57] ABSTRACT

Cathodically depositable, aqueous coating compositions comprising the reaction product of (A) polycondensates having free hydroxyl groups with a hydroxyl number of at least 40 mg KOH/g, and an average maximum molecular weight of 5000; and (B) a compound having an average of from about 0.8 to 1.5 free isocyanate groups and at least one basic aliphatically bound nitrogen atom. Optionally, there can be included in the reaction product a compound having from about 0.8 to 1.5 free isocyanate groups and from 1 to 3 ethylenically unsaturated double bonds. The coating compositions cure at relatively low temperatures and relatively short curing times to provide films having excellent resistance to water, chemicals, and corrosion.

13 Claims, No Drawings

CATHODICALLY DEPOSITABLE ESTER-CONTAINING COATING COMPOSITIONS

FIELD OF INVENTION AND BACKGROUND

The present invention is directed to the preparation of, and coating compositions which are water-dilutable upon neutralization with acids. The coating compositions are electrically depositable at the cathode of an electrodeposition system and will crosslink through thermal polymerization.

Electrodeposition of synthetic resins and plastics, although known for substantial time, has gained technical importance as a coating process is only recent years. The coating compositions or binders primarily used for commercial electrodeposition contain polycarboxylic acid resins neutralized with bases. The products deposit at the anode of an electrodeposition system. Owing to the acidic character of the resins, they are sensitive to corroding influences exerted by salts and particularly by alkalis. Furthermore, coatings of the aforesaid compositions tend to undergo spot discoloration or undergo other chemical changes as a result of the metal ions anodically dissolved from the anode. Accordingly, there has been a desire to use coating compositions which will deposit at the cathode of an electrodeposition system.

A substantial number of binders are disclosed in the literature carrying groupings neutralizable with acids which can be deposited on cathodically wired objects of an electrodeposition system. Many have disadvantages primarily due to the need to have crosslinking additives in the coating compositions which adversely affect film characteristics. Recently, however, coating compositions have been provided which are self-crosslinking through thermal polymerization. These self-crosslinking binders include binders comprising:

(A) the reaction products of diepoxy compounds with alpha, beta-unsaturated acids and, optionally, long chain fatty acids, and basic monoisocyanates as described in copending application Ser. No. 816,936 filed June 19, 1977, now U.S. Pat. No. 4,238,594, assigned to the assignee of the present application;

(B) reaction products of diepoxy compounds with monoamines and, optionally, fatty acids, and unsaturated monoisocyanates as described in copending application Ser. No. 816,937 filed July 20, 1977, now U.S. Pat. No. 4,320,220, assigned to the assignee of the present application; and (C) two moles of a diepoxy compound plus one mole of a primary-tertiary or secondary-secondary diamine plus two moles of an alpha,beta-unsaturated monocarboxylic acid and, optionally, an unsaturated fatty acid, plus an unsaturated monoisocyanate as described in copending application Ser. No. 849,265 filed Nov. 7, 1977, now U.S. Pat. No. 4,147,676, assigned to the assignee of the present application. The aforesaid binders are highly desirable due to their ability of self-crosslink through the presence of alpha,beta-unsaturation; their being water-soluble in the presence of acids due to the basic nitrogen atoms, and their ability to provide excellent films with good performance characteristics, particularly regarding resistance to corroding influences. The aforesaid binders, however, utilize expensive components and, accordingly, cannot be used for many applications because of cost.

OBJECTS OF THE INVENTION AND GENERAL DESCRIPTION

It has now been found that components containing basic functional nitrogen atoms for neutralization with inorganic or organic acids can be derived from components which are relatively inexpensive but which provide coating compositions having excellent resistance to water, chemicals, and corrosion. The relatively low cost of the components permits the use of cathodic electrodeposition on a substantially wider scale than heretofore possible.

The basic functional nitrogen atoms according to this invention are introduced into resinlike precondensates carrying free hydroxyl groups, and comprise essentially the reaction product of (A) polycondensates carrying free hydroxyl groups with a hydroxyl number of at least about 40 mg KOH/g, and an average maximum molecular weight of about 5000; and (B) compounds carrying per molecule an average of from 0.8 to 1.5, and preferably one free isocyanate group and at least one basic aliphatically bound nitrogen atom. Optionally, there can be present a compound (C) carrying per molecule an average of from 0.8 to about 1.5, and preferably one free isocyanate group and from 1 to 3 ethylenically unsaturated double bonds per molecule. Components (A) and (B), and optionally (C), are reacted at from about 10° to 100° C., and preferably from about 50° to 80° C. to an NCO-value of substantially zero. The reaction, if desired, can be carried out in the presence of an isocyanate inert solvent. Catalyst can be included if desired. The reaction product is partially or totally neutralized with inorganic or organic acids.

Suitable hydroxy group containing polycondensates for use according to the present invention are readily prepared from available raw materials. One preferred class are polyester resins containing large numbers of hydroxy groups obtained in known manner through esterification of diols or polyols with monocarboxylic acids, dicarboxylic acids or polycarboxylic acids having more than two carboxylic functional groups. The polyesters suitable for use according to this invention in general are resinlike condensates with an average maximum molecular weight of 5000 and carrying free hydroxy groups to provide a hydroxyl number of at least 40 mg KOH/g and at least 2 ester linkages, and, optionally, other modifications.

Suitable diols or polyols for use in preparing the polyesters include ethylene glycol, propylene glycol, butanediol, neopentyl glycol, hexanediol or diols derived from 4,4'-dihydroxydiphenyl-2,2-propane, such as 1,1'-isoproylidene-bis-(p-phenylene-oxy)-di-$\beta$-ethanol or the corresponding -di-propanol-2. Glycerol, trimethylol propane, trimethylol ethane, pentaerythritol, castor oil, tris hydroxy ethylisocyanurate can also be used. Furthermore, resinlike polyols such as the copolymers of styrene with allyl alcohol, carrying in the molecule an average of 5 hydroxy groups, or compounds with latent hydroxy groups, such as glycidyl esters or glycidyl ethers, can be used.

Suitable polycarboxylic acids for use in preparing the polyesters include malonic acid, succinic acid, adipic acid, sebasic acid, maleic acid (anhydride), fumaric acid, o-phthalic acid (anhydride), as well as the isomeric or substituted phthalic acids, trimellitic anhydride, triscarboxy ethylisocyanurate, and the dimerized isolene fatty acids.

Suitable monocarboxylic acids for use in preparing the polyesters include capronic acid, nonanionic acid, decane acid, sorbitic acid, benzoic acid, p-tert.-butyl benzoic acid, as well as the unsaturated and saturated fatty acids of the vegetable and animal oils or fats.

Resinous polycondensates carrying reactive hydroxyls suitable for use according to the present invention are the modified polyesters which, besides the required two ester linkages, also contain urethane groups in the molecule. Modification in the polycondensates can be obtained through copolymerization of alpha,beta-ethylenically unsaturated compounds. Vinyl compounds or vinylidene compounds suitable for use in the modification include the acrylates, hydroxy alkyl acrylates, acrylamide, acrylonitrile, and the corresponding methacrylates, styrene and vinyl toluene. The copolymerization may be carried out in known manner in the presence of solvents and initiators to form reactive radicals. In particular, copolymerization can be used to modify hydroxy group containing resinlike polycondensates containing unsaturated fatty acids. The term "hydroxy group containing resinlike polycondensates" includes modifications obtained through condensation at elevated temperature of heat-reactive phenolic resins with unsaturated fatty acid esters.

Additional suitable polyesters for use according to this invention are obtained through condensation of substances carrying preferably aliphatic chain end carboxy groups and amino alcohols, such as trishydroxymethyl amine, oxazoline ring structures with free hydroxy groups resulting.

As is apparent, the polycondensate for use according to this invention can be virtually any polycondensate provided that the polycondensate includes the reactive hydroxyl groups essential for reaction with the basic nitrogen containing component as determined and controlled by a hydroxyl number of at least 40 mg KOH/g and that it have a maximum molecular weight of about 5000.

Basic nitrogen atoms are introduced into the intermediate polycondensates as above described by reaction of the polycondensates with compounds carrying per molecule an average of from 0.8 to 1.5 isocyanate groups and at least one tertiary basic nitrogen atom. Preferably the compounds contain an average of about one isocyanate group in the molecule.

The compounds containing the basic nitrogen atoms are prepared in a separate step by reacting diisocyanates or polyisocyanates with less than a stoichiometric quantity of an amine of the formula

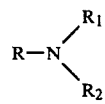

R being an alkanol or hydroxyphenol radical, and $R_1$ and $R_2$ being alkyl radicals or cycloalkyl radicals. Dialkylalkanol amines are preferred including dimethylethanol amine, diethylethanol amine or higher homologues and isomers thereof.

Suitable polyisocyanates for use in preparing the intermediate basic nitrogen carrying component are aromatic isocyanates such as 2,4- or 2,6-toluylene diisocyanate or mixtures thereof, 4,4'-diphenylmethanediisocyanate or cycloaliphatic isocyanates such as isophorone diisocyanate, cyclohexane-1,4-diisocyanate, as well as aliphatic isocyanates, such as trimethyl-hexanemethylene-1,6-diisocyanate; tris-hexamethylenetriisocyanate.

The reaction between the amine and the polyisocyanate is carried out at from 0° to 80° C., preferably at from 20° to 50° C. The weight ratios between the reaction partners are chosen in order that the formed compound carries from about 0.8 to 1.5, and preferably one free isocyanate group. This product is at times herein designated as the "basic isocyanate intermediate."

In order to enhance the thermal crosslinking reaction of the cathodically deposited film, it is desirable to react the reaction products of the hydroxy containing polycondensate and the basic isocyanate intermediate with compounds carrying from about 0.8 to 1.5 free isocyanate groups in the molecule and from 1 to 3 olefinically unsaturated double bonds. These compounds are prepared in a separate reaction step from the aforementioned polyisocyanates and a reaction partner which carries at least one isocyanate reactive hydrogen atom and from 1 to 3 olefinic double bonds. Suitable unsaturated compounds include hydroxyalkyl esters of acrylic acid or methacrylic acid, triethyleneglycol mono(meth)acrylate, trimethylolpropanedi(meth)acrylate, allyl alcohol, tripropyleneglycol monoabietate, oleyl alcohol, or linoleyl alcohol. The reaction between the polyisocyanate and the isocyanate reactive olefinically unsaturated compound is carried out, optionally in an isocyanate inert solvent, at temperatures of from 10° to 100° C., and preferably from about 50° to 80° C. Organic stannous compounds, as catalysts, can be advantageously used. The weight ratios of the reactants are chosen such that the formed compound carries from about 0.8 to 1.5, and preferably one free isocyanate group in the molecule. The compound is at times herein designated as the "olefinically unsaturated isocyanate intermediate."

The reaction components used in preparing the binders of the present invention are effected in order that the hydroxy-group containing polycondensates, preferably dissolved in isocyanate-inert solvents, are reacted at from 10° to 100° C., preferably at from 50° to 80° C., with the desired quantity of the basic isocyanate intermediate and, optionally, with the olefinically unsaturated isocyanate intermediate, optionally in the presence of organic stannous compounds as catalysts, until an NCO-value of zero is obtained. The quantity of basic isocyanate intermediate is chosen in order that the basicity of the binder upon neutralization with the acid will provide sufficient water dilutability at a pH-value of from 4 to 9, and preferably 6 to 8. The reaction between the hydroxy group containing polycondensates, the basic isocyanate intermediate, and the olefinically unsaturated intermediate may be effected in random sequence, separately or jointly.

In order to reduce the stoving temperatures or to obtain a particular corrosion protection, it can be of advantage, although not essential, to co-employ additional known crosslinking agents, such as melamine- or phenol-formaldehyde condensates. Such resins are prepared according to known methods by alkaline condensation of formaldehyde or of formaldehyde-splitting substances with urea, melamine, benzoguanamine, acetoguanamine, phenol, cresol, p.-tert.-butyl-phenol, Bisphenol A, and the like. The methylol compounds may be optionally etherified with alcohols. A preferred product in this group is the reaction product of phenol with formaldehyde carrying allyl ether groups. If the crosslinking agents are non-water-soluble, it is advantageous to combine them by careful condensation with the binder of the invention at temperatures of from 50° to 120° C. The reaction is carried out until excellent dilutability with water of the reaction mass upon neutralization with low molecular weight organic acids is obtained.

The basic nitrogen atoms of the coating compositions of the invention are partially or totally neutralized with organic and/or inorganic acids. The degree of neutralization in the individual case depends upon the properties of the binder employed. In general sufficient acid is added to allow dispersion or dilution with water at a pH-value of the coating of from about 4 to 9, and preferably of from about 6 to 8.

The concentration in water of the binder depends upon the parameters of electrodeposition and may lie in a range of between about 3 to 30 percent by weight, preferably at from about 5 to 15 percent by weight. The applied coating composition can optionally contain various additives, such as pigments, extenders, surface active agents, etc. Upon electrodeposition, the binder of the invention as a vehicle of the aqueous coating composition is wired to a conductive anode and cathode, the surface of the cathode being coated with the coating composition. The conductive substrates to be coated may be of a variety of materials, and particularly metals such as steel, aluminum, copper, or the like. Other metalized materials or materials rendered conductive through a conductive coating can be employed. After deposition, the coating is cured at a stoving temperature of from about 130° to 200° C., preferably 150° to 180° C., for about 5 to 30 minutes, preferably 10 to 25 minutes.

The following examples illustrate the invention without limiting its scope.

PREPARATION OF THE INTERMEDIATES

(A) Hydroxy Group Containing Polycondensates

Intermediate (A 1)

79 g of isononanoic acid, 89 g of tall oil fatty acids, 102 g of pentaerythritol, 45 g of trimethylolpropane, and 120 g of isophthalic acid are charged to a three-neck flask equipped with Dean and Stark receiver, reflux condenser, and an inert gas charge and are heated to 230° C. while stirring. As soon as the acid value has fallen below 12 mg KOH/g, azeotropic solvent reaction with xylol is started. When the acid value has fallen to below 3 mg KOH/g and the quantity of reaction water has attained 42 g, the solvent is vacuum-stripped at decreasing temperature. The finished Intermediate A 1 has a solids content of at least 99 percent, an intrinsic viscosity of 6 ml/g, measured in dimethylformamide at 20° C., and a hydroxyl number of 250 mg KOH/g.

Intermediate (A 2)

As described above, 300 g of tung oil are heated to 100° C. At this temperature a blend of 0.5 g of potassium hydroxide in 0.5 g of monoethylene glycol is added. The temperature is raised to 160° C. and 48 g of pentaerythritol and 48 g of trimethylol propane are added. The temperature is raised to 220° C. and held until solubility in ethanol remains constant. The temperature is reduced to 80° C. and 113 g of a heat-reactive phenolic resin which has been prepared in alkaline solution from p-tert.-butylphenol and formaldehyde is added slowly. The reaction is finished when the viscosity of a solution of 72 g of Intermediate A 2 and 48 g of ethylene glycol monoethyletheracetate reaches a value of about 100 s (DIN 53 211). The hydroxyl number of the phenol modified polyester is 280 mg KOH/g.

Intermediate (A 3)

220 g of a copolymer of styrol and allyl alcohol with a hydroxyl number of 250 mg KOH/g are heated to 220° C. together with 140 g of tall oil fatty acid. As soon as the acid value has fallen below 12 mg KOH/g, the reaction water is eliminated by azeotropic distillation with xylol. If the acid value has attained a value of 3 mg KOH/g, the xylol is vacuum-stripped with decreasing temperature. The solids content of Intermediate A 3 is a minimum 99 percent, the hydroxyl number is 80 mg KOH/g.

Intermediate (A 4)

300 g of dehydrated castor oil and 60 g of linseed oil are heated to 150° C. while stirring. With vigorous stirring, at 150° C., a blend of 80 g vinyltoluol and 0.8 g of di-tert.-butyl peroxide is continuously added. Within one hour the temperature is raised to 200° C. and held until 90 percent of the monomer has reacted. At decreasing temperature, the excess vinyltoluol is vacuum-stripped and the temperature is reduced to 180° C. 117 g of trimethylol propane, 1 g of calcium naphthenate, 4 percent, and a solution of 0.5 g of potassium hydroxide in 0.5 g of monoethylene glycol are added. After the above addition the temperature is raised to 240° C. and the reaction ended when the solubility in n-butanol remains constant. The vinylated polyester has a hydroxyl number of 245 mg KOH/g.

Intermediate (A 5)

485 g of dimethylterephthalate and 555 g neopentylglycol are charged to a round flask equipped with stirrer, thermometer, reflux condenser, and Dean and Stark receiver, and slowly heated to 170° C.–200° C. while stirring. At the same temperature the reaction is carried on until the theoretical quantity of methanol has distilled. 645 g of adipic acid are then added and, using xylol as entraining agent, the reaction is continued at 170° to 200° C. until an acid value of 131 mg KOH/g is obtained. Thereafter, at 150° to 160° C., 415 g of trishydroxymethyl aminomethane are added. The temperature is raised to 170° to 190° C. and held until an acid value of below 1 mg KOH/g is attained. The reaction product is diluted at 120° C. with ethyleneglycol monoethyletheracetate to a solids content of 75 percent and has a hydroxyl number of 224 mg KOH/g.

(B) Basic Isocyanate Intermediates

Intermediate (B 1)

174 g of toluylene diisocyanate (a blend of 80 percent of 2,4- and 20 percent of 2,6-isomers) are charged to a three-neck flask equipped with reflux condenser and inert gas duct, and, with absolute protection from moisture and effective cooling, 89 g of dimethylethanol amine, 60 percent in ethyleneglycol monoethylether acetate, are continuously added. The reaction temperature is held below 25° C. The reaction is finished when the theoretical isocyanate value is 16 percent or lower.

Intermediate (B 2)

174 g of toluylene diisocyanate (a blend of 80 percent of 2,4- and 20 percent of 2,6-isomers) are mixed with 194 g of ethyleneglycol monoethylether acetate in a three-neck flask equipped with reflux condensor and inert gas duct. Access of moisture is absolutely prevented. With intense cooling, 117 g of diethylethanolamine are added continuously within one hour at a temperature of below 25° C. The isocyanate value of the final product is 14.4 percent.

(C) Olefinically Unsaturated Isocyanate Intermediates

Intermediate (C 1)

168 g of hexamethylene diisocyanate are mixed with 200 g of ethyleneglycol monoethylether acetate in a three-neck flask with reflux condensor and inert gas duct, and, while maintaining total prevention of moisture access, is heated to 60° C. At the stated temperature a blend of 130 g of hydroxyethylmethacrylate, stabilized with 0.1 g of hydroquinone, are added dropwise. The reaction is finished, about 2 hours, when the isocyanate value has attained 14.1 percent or slightly less.

Intermediate (C 2)

In a three-neck flask equipped with reflux condenser and inert gas duct, with no possible access of moisture, 222 g of isophorone diisocyanate are blended with 325 g of ethyleneglycol monoethylether acetate and heated to 40° C. 265 g of linoleyl alcohol are then added continuously and, after the end of the addition, the temperature is raised to 90° C. and held, until the isocyanate value has attached 8.6.

EXAMPLES 1–7

In a reaction vessel equipped with stirrer, addition funnel, thermometer, and reflux condenser, the hydroxy-rich polycondensate (Intermediate A), in the presence of ethyleneglycol monoethylether acetate, an isocyanate inert solvent, is blended with a basic isocyanate intermediate (Intermediate B), preventing access of moisture, and is reacted at 40° to 100° C. to an NCO-value of approximately zero. Subsequently, the reaction product is optionally mixed with an alpha,beta-olefinically unsaturated isocyanate intermediate (Intermediate C) and reacted, also at from 40° to 100° C., until an NCO-value of zero is obtained.

The reaction of Intermediate A with Intermediate B and Intermediate C may also be effected in one reaction step at from 40° C. to 100° C. with the same results.

It is also possible to blend the described reaction products with crosslinking agents such as urea resins, melamine resins, or phenolformaldehyde resins, and carefully reacted until substantial water dilutability is attained.

The quantities of the Intermediates and the reaction conditions for Examples 1–7 are tabulated in Table 1.

TABLE 1

| Inter-mediates | (g)(+) | | Crosslinking Agent(+) | | | Reaction Conditions h/°C. |
|---|---|---|---|---|---|---|
| 1 | 1000 A3 | 440 B1 | — | — | — | — | 1/40 |
| 2 | 1000 A2 | 440 B1 | 203 C2 | 342 BP | — | — | 2/50(++) |
| 3 | 1000 A1 | 485 B2 | — | — | — | — | 4/40 |
| 4 | 1000 A1 | 440 B1 | 203 C2 | — | — | 357 PA | 3/60(+++) |
| 5 | 1000 A4 | 485 B2 | 125 C1 | — | 342 ML | — | 3/80(++) |
| 6 | 1000 A5 | 395 B1 | 455 C1 | — | — | — | 2/70(+++) |
| 7 | 1000 A5 | 395 B1 | 317 C1 | — | — | — | 2/70(++++) |

(+)All quantities refer to resin solids
(++)Subsequent reaction with Intermediates B and C
(+++)Simultaneous reaction with Intermediates B and C
Key to abbreviations in Table 1:
PB: Bisphenol A-formaldehyde resin
ML: Melamine-formaldehyde resin
PA: Phenol-formaldehyde resin with allyl ether groups (Methylon 75108 manufactured by General Electric)

EVALUATION OF THE BINDERS

Of the binders each 100 g resin solids samples were mixed with the corresponding quantity of acid and made up to 1000 g with deionized water while stirring. The 10 percent solutions were deposited using direct current on steel panels as the cathode. Deposition time in all cases was 60 seconds. The coated substrates were rinsed with deionized water and cured at elevated temperature. Average film thickness of the cured films was between 13 to 17 μm. Table 2 gives a summary of the evaluation.

TABLE 2

| | Neutralization | | | Deposition | | Evaluation | | |
|---|---|---|---|---|---|---|---|---|
| Examples | Quantity(1) | Type(2) | pH(3) | Volt | Cure Min/°C. | Hardness(4) | Indentation(5) | Resistance(6)/(7) |
| 1 | 3.5 | E | 5.8 | 150 | 20/190 | 160 | 7.9 | 320/240 |
| 2 | 3.8 | M | 6.2 | 180 | 30/180 | 165 | 7.1 | 360/120 |
| 3 | 4.0 | M | 6.0 | 200 | 25/180 | 170 | 8.0 | 360/240 |
| 4 | 3.8 | E | 6.0 | 250 | 25/180 | 185 | 8.5 | 480/360 |
| 5 | 3.6 | E | 5.9 | 230 | 30/170 | 175 | 7.9 | 360/240 |
| 6 | 4.0 | E | 6.1 | 180 | 30/180 | 170 | 8.4 | 400/240 |
| 7 | 3.9 | M | 6.0 | 190 | 30/180 | 180 | 8.8 | 400/200 |

(1)quantity of acid in g added to 100 g of resin solids
(2)E: acetic acid; M: lactic acid
(3)measured as a 10% aqueous solution
(4)König pendulum hardness DIN 53 157 (sec)
(5)Erichsen indentation DIN 53 156 (mm)
(6)hours of water soak at 40° C. until corrosion or blistering becomes visible
(7)salt spray ASTM-B117-64: 2 mm of corrosion at the cross incision after the stated hours For the evaluation, degreased non-pretreated steel panels were coated with a pigmented paint consisting of 100 parts by weight of resin solids, 20 parts by weight of aluminum silicate pigment, and 2 parts by weight of carbon black.

In the above illustrative examples various modifications can be made falling within the scope of the claimed invention. Such modifications being within the ability of one skilled in the art are within the scope of the present invention.

It is claimed:

1. Thermosetting aqueous binders for cathodically depositable coatings comprising the reaction product of (A) a hydroxyl group containing polycondensate having a hydroxyl number of at least about 40 mg KOH/g, and an average maximum molecular weight of about 5000; and (B) compounds carrying per molecule an average of from about 0.8 to 1.5 free isocyanate groups and at least one basic tertiary aliphatically bound nitrogen atom, neutralized with inorganic or organic acids.

2. The thermosetting aqueous binders of claim 1 wherein the free isocyanate groups per molecule of compound (B) is 1.

3. The thermosetting aqueous binders of claim 1 including within the reaction product component (C) having per molecule an average of from 0.8 to 1.5 free isocyanate groups and from about 1 to 3 olefinic double bonds.

4. The thermosetting aqueous binders of claim 1 wherein component (A) is a polyester having at least 2 ester linkages in the molecule.

5. The thermosetting aqueous binders of claim 4 wherein component (A) also includes urethane linkages.

6. The thermosetting aqueous binders of claim 4 wherein the polyesters are oil or fatty acid modified alkyd resins.

7. The thermosetting aqueous binders of claim 1 wherein component (A) is a polyester modified through copolymerization with an ethylenically unsaturated compound.

8. The thermosetting aqueous binders of claim 1 wherein component (A) is a polyester including an oxazoline structure.

9. The thermosetting aqueous binders of claim 1 wherein component (B) is the reaction product of a polyisocyanate with an amine of the formula

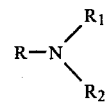

wherein R is an alkanol or hydroxyphenol radical, and $R_1$ and $R_2$ are alkyl or cycloalkyl radicals.

10. The thermosetting aqueous binders of claim 1 including a crosslinking agent.

11. The thermosetting aqueous binders of claim 10 wherein the crosslinking agent is urea-, melamine-, or phenol-aldehyde condensate.

12. The process of providing coating compositions which will cathodically deposit when used in an electrodeposition process including reacting at a temperature of from about 10° to 100° C. (A) a polycondensate having free hydroxyl groups and a hydroxyl number of at least about 40 mg KOH/g, and an average molecular weight of about 5000; and (B) compounds carrying per molecule an average of from about 0.8 to 1.5 free isocyanate groups and at least one basic tertiary aliphatically bound nitrogen atom, said reaction being carried to an NCO-value of substantially zero, and neutralizing said reaction product with an inorganic or organic acid.

13. The process of claim 12 including in the reaction product a component (C) carrying per molecule an average of from 0.8 to 1.5 free isocyanate groups and from 1 to 3 ethylenically unsaturated double bonds.

* * * * *